United States Patent
Hodge (10) Patent No.: US 10,464,474 B2
(45) Date of Patent: Nov. 5, 2019

(54) SYSTEM AND METHOD FOR MONITORING A FORMER CONVICT OF AN INTOXICATION-RELATED OFFENSE

(71) Applicant: **Global Tel*Link Corporation**, Reston, VA (US)

(72) Inventor: Stephen L. Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 15/874,528

(22) Filed: Jan. 18, 2018

(65) Prior Publication Data

US 2019/0023177 A1    Jan. 24, 2019

Related U.S. Application Data

(63) Continuation of application No. 15/657,935, filed on Jul. 24, 2017, now Pat. No. 9,878,660.

(51) Int. Cl.
| | |
|---|---|
| *B60Q 1/50* | (2006.01) |
| *H04W 4/02* | (2018.01) |
| *G08G 1/052* | (2006.01) |
| *H04L 29/08* | (2006.01) |
| *G08G 1/017* | (2006.01) |
| *H04W 4/40* | (2018.01) |

(52) U.S. Cl.
CPC ............. *B60Q 1/50* (2013.01); *G08G 1/017* (2013.01); *G08G 1/0175* (2013.01); *G08G 1/052* (2013.01); *H04L 67/12* (2013.01); *H04W 4/027* (2013.01); *H04L 67/20* (2013.01); *H04W 4/40* (2018.02)

(58) Field of Classification Search
CPC ......... B60Q 1/50; G08G 1/052; H04W 4/027; H04L 67/20
USPC .............................................. 340/425.5, 429
See application file for complete search history.

(56) References Cited

U.S. PATENT DOCUMENTS

| | | | |
|---|---|---|---|
| 9,272,713 B1 | 3/2016 | Dvoskin | |
| 2006/0095175 A1* | 5/2006 | deWaal ................... | G07C 5/008 701/31.4 |
| 2009/0128356 A1 | 5/2009 | Niita | |
| 2011/0039581 A1 | 2/2011 | Cai | |
| 2014/0333425 A1* | 11/2014 | Giraud ................... | G07C 5/008 340/438 |
| 2015/0105105 A1* | 4/2015 | Van Heerden ...... | H04W 64/006 455/456.3 |
| 2017/0013393 A1 | 1/2017 | Chang | |

(Continued)

*Primary Examiner* — Ojiako K Nwugo
(74) *Attorney, Agent, or Firm* — Sterne, Kessler, Goldstein & Fox P.L.L.C.

(57) ABSTRACT

A system and method are disclosed for preventing a restricted individual from operating a motor vehicle. The system monitors a speed of the individual via a smart device associated with the individual. The system activates a monitoring function based on a detected speed of the device, which may evidence the individual riding in a motor vehicle. The system them verifies that the user of the device is the restricted individual through a variety of different identification methods. Once identified, the system accesses various data sources associated with one or more ride applications running on the smart device in order to determine whether the restricted individual has requested a ride from a third party during a relevant time period. After analyzing the data, a determination is made as to whether the individual is driving, or whether more information is needed.

15 Claims, 5 Drawing Sheets

(56) References Cited

U.S. PATENT DOCUMENTS

| | | |
|---|---|---|
| 2017/0039784 A1* | 2/2017 | Gelbart .............. G06Q 30/0206 |
| 2017/0146801 A1* | 5/2017 | Stempora ............... G06Q 40/08 |
| 2017/0168164 A1 | 6/2017 | Lee |
| 2017/0233168 A1* | 8/2017 | Horvath ................ A61M 5/002 |
| | | 206/366 |

* cited by examiner

SYSTEM AND METHOD FOR MONITORING A FORMER CONVICT OF AN INTOXICATION-RELATED OFFENSE

CROSS-REFERENCE TO RELATED APPLICATIONS

This application is a continuation of U.S. patent application Ser. No. 15/657,935, filed on Jul. 24, 2017, which is incorporated by reference herein in their entirety.

BACKGROUND

Field

This disclosure relates to a system for allowing an offender to assist with a booking process in order to streamline the booking process, as well as to free up resources for officers to perform other more critical tasks.

Background

Former detainees, who have been convicted of certain intoxication-related crimes, may be prohibited from operating a motor vehicle. Previously, there was no way to determine whether such an individual was operating a motor vehicle, unless that individual was pulled over. Although the causes may vary for pulling over a motorist, there is a high likelihood that a former convict of an intoxication-related crime will be intoxicated again, and thus may already be intoxicated at the time of being stopped.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

This disclosure pertains to a system for preventing those who have been convicted of select intoxication-related offenses from operating a motor vehicle when they are prohibited from doing so. Typically, when an individual has been convicted of violating certain intoxication laws, such as driving under the influence of alcohol, etc., that person may be restricted from driving for public safety purposes. Unfortunately, barring some extreme exceptions, there are not readily available methods to ensure that that individual does not ignore that prohibition against driving.

For example, there currently exists a system in which an electrical breathalyzer device is wired to a starting apparatus of the individual's vehicle. The automobile will only start after the individual blows into the breathalyzer, and the individuals breath has been analyzed and falls below the predetermined blood-alcohol content (BAC) threshold. However, there are significant problems associated with this system. First, this only prevents the individual from operating his/her own vehicle, and does nothing to prevent the individual from operating a rented or friend's vehicle. Additionally, since there is currently no means for extracting biometric information from a person's breath, any individual could blow into the breathalyzer in place of the restricted individual, thereby subverting the system.

In light of the above, a more effective system for preventing restricted operation of a motor vehicle is described herein. The system activates upon detection that the user is traveling faster than a predetermined rate of speed. Once activated, the system uses either RFID or biometrics to verify the identity of the individual. Then, the system acquires information from an application on the individual's phone to verify that the individual is taking transportation from a third-party. Alternatively, the system can analyze photo or other evidence to verify that the individual is not driving. When the system is unable to gain these assurances, authorities can be notified. These, and other aspects, are described in detail below.

Exemplary Environment

Figure 1:
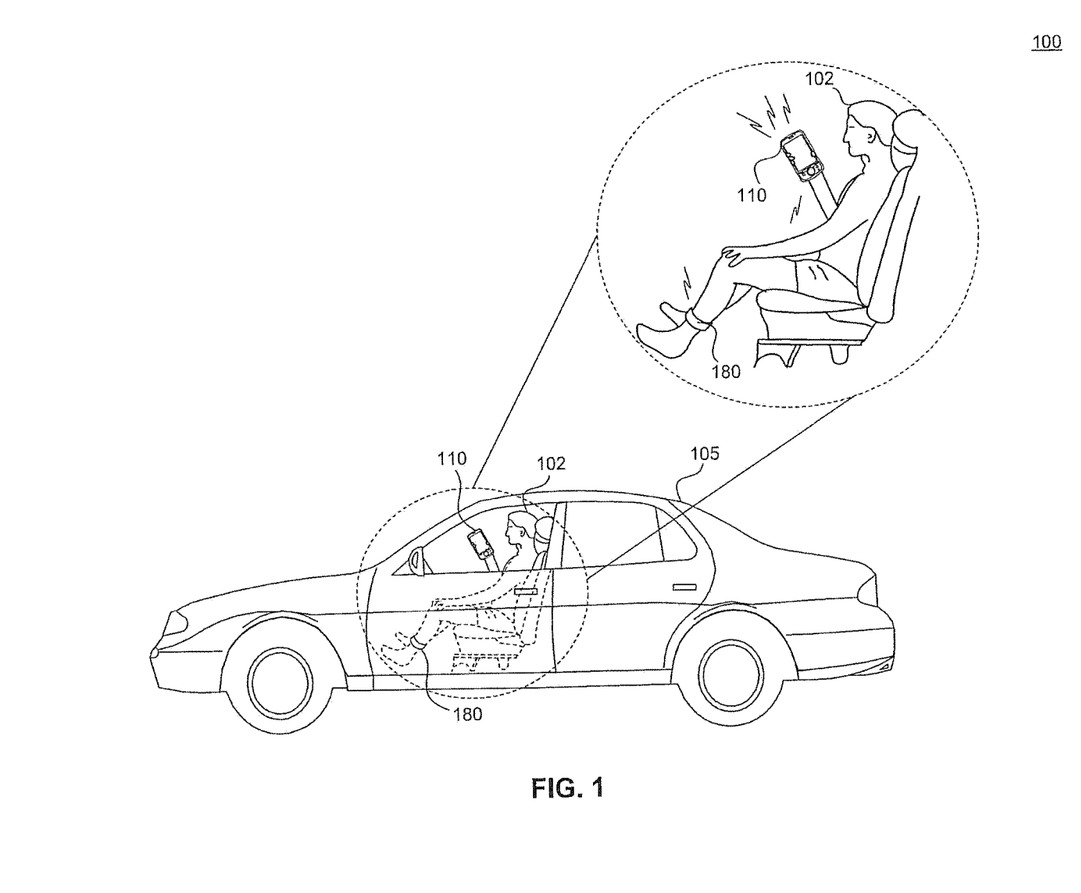
FIG. 1 illustrates a diagram of an exemplary monitoring environment according to embodiments of the present disclosure.

FIG. 1 illustrates a diagram of an exemplary environment 100 in which the monitoring system operates. In an embodiment, the restricted individual 102 is in possession of a smartphone or similar device 110. Additionally, the individual 102 is fitted with an ankle bracelet 180 or other monitoring device. Ankle bracelets are commonly affixed to certain offenders for a variety of reasons, such as to monitor the individual's location to being within a restricted area. However, the ankle bracelet in this embodiment serves a different purpose. The ankle bracelet stores a unique identifier associated specifically with the individual. This positively identifies the individual to the monitoring system running on the smartphone device 110. In another embodiment, as will be discussed in further detail below, the individual can be identified to the monitoring system without the use of an ankle bracelet, such as through biometric verification, etc.

The system does not activate solely because the individual 102 has entered a motor vehicle 105, but activates when the individual 102 has exceeded a predetermined speed. Once activated, the smartphone interfaces with the ankle bracelet to authenticate the individual, and then carries out a number of subsequent operations to determine whether the restricted individual 102 is driving the vehicle 105. System operation will be described in further detail with respect to FIGS. 2 and 3.

Exemplary Monitoring System

Figure 2:
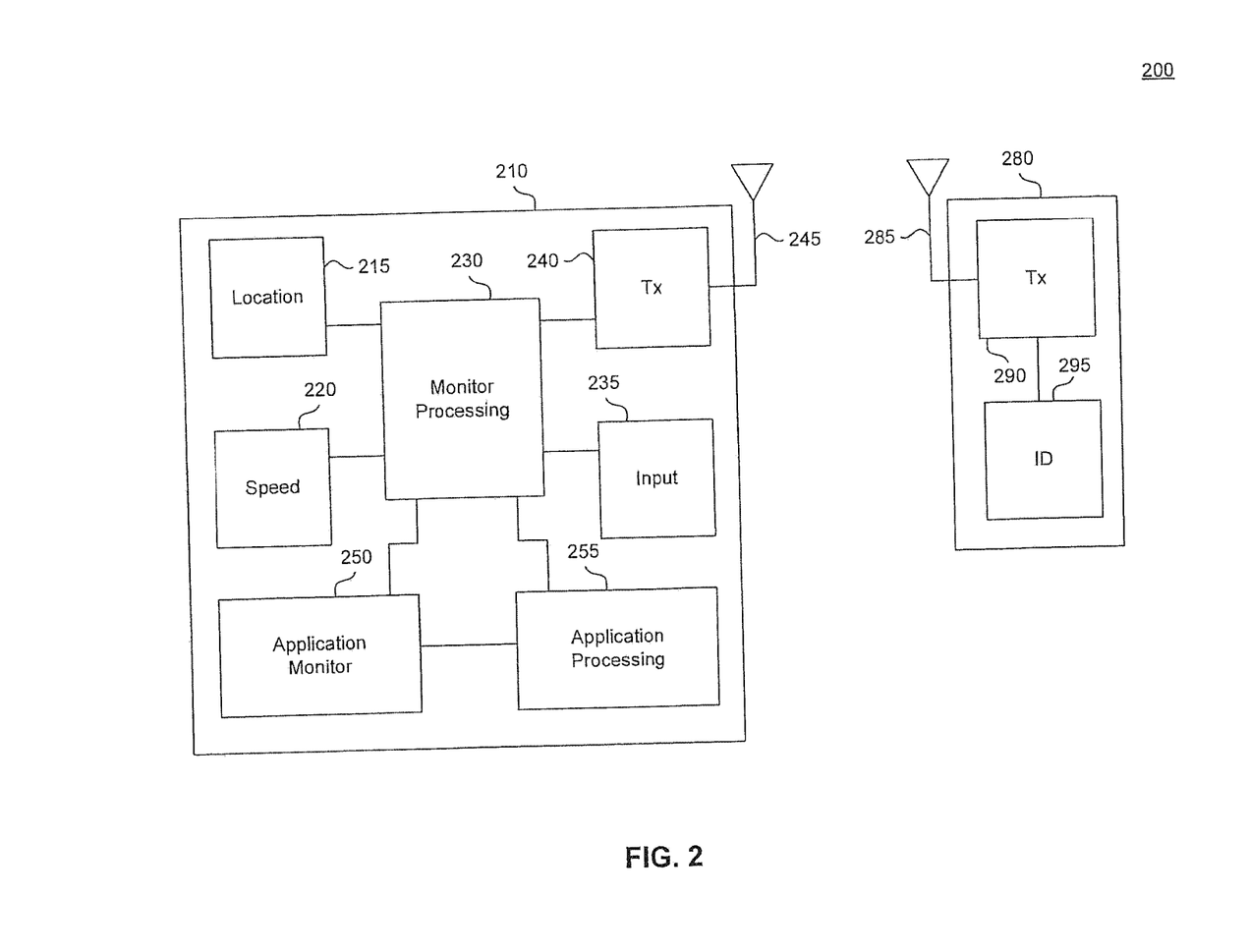
FIG. 2 illustrates a block diagram of an exemplary monitoring system according to embodiments of the present disclosure.

FIG. 2 illustrates a block diagram of an exemplary monitoring system 200 according to embodiments of the present disclosure. The system includes a smart device 210 and an RF transmitter 280. In an embodiment, the RF transmitter 280 functions using RFID communications, such as near-field load modulation. The smart device 210 operates the substantial functionality of the monitoring system, whereas the RF transmitter 280 stores identification information of the individual 202, and is used to positively verify the presence and usage of the individual.

The smart device includes monitor processing 230 in the form of one or more hardware processors and/or circuits that performs the processing from the various additional device elements for determining whether the individual is in violation of the driving restrictions. Those additional device elements are connected to the monitor processing 230, and carry out several additional functions for supporting the monitor processing 230. For example, location 215 provides location information to the monitor processing 230. In an embodiment, the location 215 is a GNSS receiver that receives GNSS signals from a network of GNSS satellites, such as GPS. In other embodiments, the location 215 determines location without the use of GNSS satellite signals, such as by triangulation from signal received from nearby base stations and/or access points.

The speed 220 determines a speed with which the smart device 210 is moving. In an embodiment, speed 220 makes the speed determination based on information received from location 215, such as based on a change of GNSS position. However, in other embodiments, speed 220 determines the speed of the smart device 210 without the use of location information, such as by detecting accelerations of the smart device 210 via an accelerometer.

Operating alongside the monitor processing 230, application processing 255 operates other applications running on the smart device 210. Although any number of applications may be running on the smart device 210 at any given time, there are certain applications that are particularly pertinent to the present disclosure. For example, ride-sharing and ride-hailing apps, such as Uber™ or Lyft™, operate to request rides or taxi-like services. An application monitor 250 provides an interface between the monitor processing 230 and the application processing in order to provide information to the monitor processing 230 from one or more relevant applications operating in the application processing 255.

The smart device 210 also includes an input 235, by which the individual can directly provide certain information to the smart device, such as biometric information. Additionally, a transceiver 240 is connected with an antenna 245 that is used to communicate with outside devices, such as RF transmitter 280.

The RF transmitter 280 includes a transceiver 290 connected to an antenna for sending and receiving information from an outside device, such as smart device 210. The RF transmitter 280 also includes an Identification 295. The Identification 295 stores the unique identifier associated with the individual. In an embodiment, the unique identifier is globally unique.

In operation, the speed 220, alone or together with the location 215, determines a rate of speed of the smart device 210, and forwards the result to the monitor processing 230. As discussed above, the speed of the smart device 210 may be determined in a variety of different ways, including determining rate of change of GNSS position based on information received from location 215, as well as force measurements from one or more force detection sensors (e.g., accelerometer).

The monitor processing 230 determines, based on the received speed information, whether the smart device 210 is exceeding a predetermined threshold speed. If the monitor processing 230 determines that the threshold speed has been exceeded, the monitor processing carries out further steps to attempt to determine whether the individual associated with the smart device 210 is currently driving a motor vehicle, in violation of the prohibition from doing so.

To that end, the monitor processing 230 first verifies an identity of the individual. This ensures that the restricted individual is present with the device so as to prevent false positives, among other uses. In order to verify the identity of the individual, the monitor processing causes the transceiver 240 to transmit a signal to the RF transmitter 280. The transmitted signal is received by the RF transmitter 280, which causes the RF transmitter 280 to retrieve the unique identifier from the Identification 295. The RF transmitter then replies to the signal by sending the unique identifier back to the smart device 210. In an embodiment, the unique identifier is encoded prior to transmission.

In another embodiment, rather than being configured for RFID communication, the RF transmitter 280 is instead configured to communicate using another wireless communication protocol. An example of such a protocol is Bluetooth®, such as Bluetooth Low Energy (BLE). Bluetooth Low Energy is a wireless personal area network technology designed for low power consumption. Many mobile operating systems natively support BLE. When the transmitter 280 and the transceiver 240 are configured in this manner, the transmitter 280 periodically pulses a notification to the smart device 210. In order to conserve batter, this pulse is preferably sent relatively infrequently, but often enough to satisfactorily ensure that the user is present when the driving motion is detected. In an embodiment, the pulse is transmitted to the smart device every 4-6 minutes. As is understood from this example, the RF transmitter 280 can operate in a passive mode or an active mode. In the passive mode, the RF transmitter does not require a power source, and is instead activated passively by an outside device. In the active mode, the RF transmitter requires a power source in order to generate the signals transmitted, such as the pulse notifications described above.

Once received by the smart device 210, the monitor processing 230 makes a determination as to whether the received unique identifier matches that associated with the restricted individual. If there is no match, then the monitoring goes dormant until after the speed of the smart device has been below the predetermined speed threshold for longer than a predetermined duration, or until after a predetermined amount of time has passed since the monitoring went dormant. On the other hand, if there is a match, then the monitor processing 130 seeks out information to verify whether the restricted individual is operating a motor vehicle.

In the embodiment illustrated in FIG. 2, the monitor processing 230 causes the application monitor 250 to attempt to retrieve information from one or more ride-sharing and/or ride-hailing applications running in the application processing 255. As discussed above, several applications exist that are available on smart devices for acquiring rides from third parties. Many of those applications, such as Uber and Lyft transmit a request along with a location of the individual. Many notifications are then exchanged between the smart device 210 and a server of the ride provider. Such notifications indicate that a ride has been scheduled, has picked up, has delivered, or informs as to a projected or final cost of the ride.

Upon receiving the instruction from the monitor processing 230, the application monitor 250 begins accessing memory registers and cache memory associated with the ride-sharing and/or ride-hailing applications on the phone in order to seek out any such notifications. In other embodiments, the application monitor may seek out the requested information in other manners, such as by monitoring device instructions, monitoring datastreams traversing a data bus or transmitted from the antenna 245, monitoring screen states, etc.

When relevant data is found, the application monitor 250 forwards the information to the monitor processing 230, which analyzes the received information. As part of this analysis, the monitor processing 230 attempts to determine whether the individual is using any of those applications to travel. The monitor processing 230 will examine numerous data points as part of this determination, and will preferably make a final determination based on an algorithm that takes into account numerous of the data points found. Ultimately, based on that algorithm, the monitor processing 230 will determine whether the individual is likely to be driving, or rather is likely to be riding as a passenger in a motor vehicle. Preferably, the monitor processing examines the data for the presence of a ride request, as well as a date/time stamp and/or identification information. Together, this information evidences that the request was made within a predetermined time of the drive detection, and is associated with the restricted individual.

In an embodiment, the algorithm may consist of calculating a weighted sum of different data points. For example, data points that evidence that the individual is using one of the riding applications being processed in application processing 255 will be assigned certain weights that differ from those data points that evidence against that determination. After averaging the weighted data points, the resulting weighted average is compared against a threshold value. If the weighted average exceeds the threshold, then the monitor processing 230 determines that the individual is utilizing one of the riding applications, and is not driving. As a result, no further action is taken until after a predetermined amount of time as elapsed, or until after the smart device is below the predetermined speed threshold for greater than a predetermined period of time.

On the other hand, if the monitor processing 230 determines based on the algorithm that the individual is unlikely to be utilizing a riding app, then the monitor processing 230 determines that the individual is likely driving. As a result of this determination, the monitor processing 230 generates an alert signal that includes a preset message and a location received from location 215, and causes the transceiver 240 to transmit the alert signal to appropriate authorities, notifying them of the likely violation and providing them with the location of the individual.

In embodiments, if the monitor processing 230 determines that the individual is not using one of the riding applications to travel, then the monitor processing can first seek out additional information from the individual before determining that the individual is violating his prohibition against driving. For example, after making the negative determination, the monitor processing 230 issues a notification to the individual that authorities will be alerted to a violation of the individual's prohibition against driving unless additional evidence is received to establish the contrary.

In response, the monitor processing 230 may be capable of, and configured to, analyze a wide variety of additional information received from the user. For example, the user may access the riding application and capture a screenshot showing relevant information relating to a current ride, such as date/time, destination, etc. The monitor processing 230 employs image processing, such as optical character recognition, to extract the relevant information from the image and update its determination regarding whether the individual is driving.

The monitor processing 230 may be configured to process a wide variety of additional information. For example, in some cases, the monitor processing 230 may allow for the individual to activate a camera of the smart device in order to take a picture of the individual's environment. Such a picture may show a bicycle or other non-motorized vehicle being used by the individual, or may show another individual driving an automobile in which the individual is a passenger. In order to decipher those images, the monitor processing 230 may be configured to employ pattern matching and image recognition in order to identify bicycle handle-bars and/or tire widths, a steering wheel and/or seat locations within an automobile, as well as to detect and identify faces. Through these capabilities, the monitor processing 230 is able to analyze a wide variety of information provided to it by the user in order to ensure accurate detection of a violation.

Figure 3:
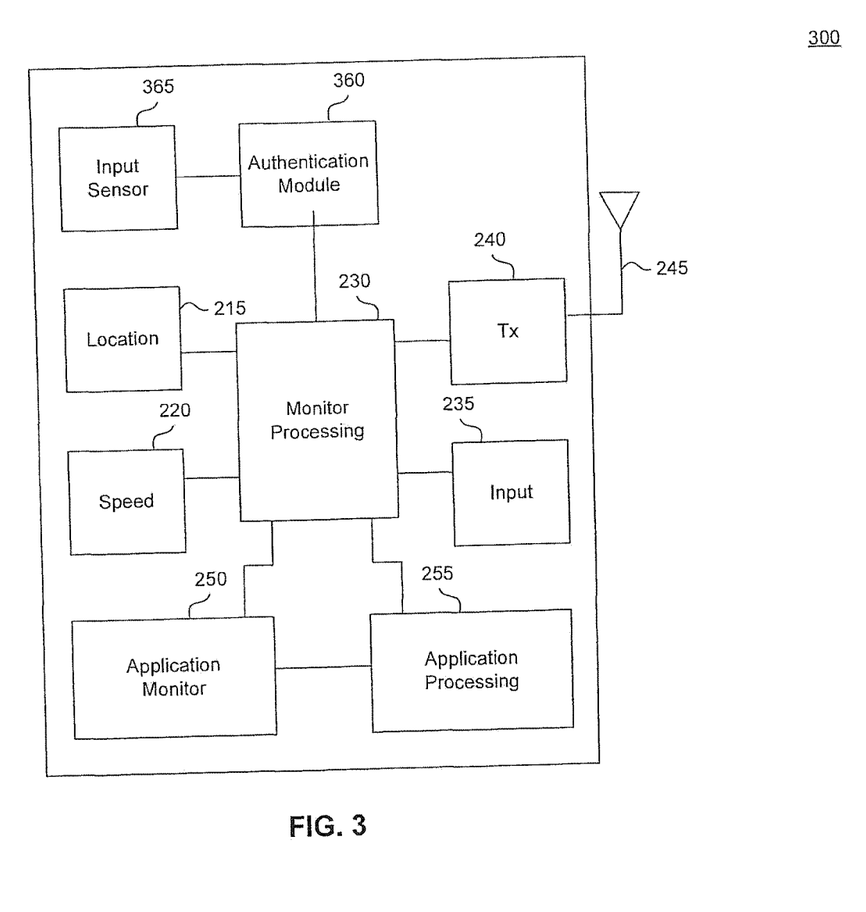
FIG. 3 illustrates a block diagram of an exemplary monitoring system, according to embodiments of the present disclosure.

FIG. 3 illustrates a block diagram of an exemplary monitoring system 300, according to embodiments of the present disclosure. The monitoring system 300 does not require any communication with an outside device for verifying the identity of the individual, but rather is instead self-encapsulating. In the embodiment of FIG. 3, the smart device 210 also includes an input sensor 365 and an authentication module 360.

Because the RF transmitter 180 is not available in this embodiment, the smart device 210 must verify the presence of the individual in an alternative manner. Thus, the smart device 210 prompts the user of the device to provide certain personal information using the input sensor 365. In various embodiments, the input sensor is any biometric sensor or manual input device. A manual input device allows the individual to enter personal verification data, such as name and unique identifier. However, a biometric sensor is more secure and less prone to faking, hacking, etc. After the input sensor 365 receives the input from the individual, the authentication module 360 compares the received information to previously-stored information. When the received information is biometric information, the authentication module 360 performs an analysis of the information in order to carry out a probabilistic comparison between the received biometric information and the previously-stored biometric information of the same type. Such comparison may include comparing voice prints, face prints, facial architectures, iris scans, etc. The result of the comparison is then acted upon in the manner already described with respect to the embodiment of FIG. 2.

Figure 4:
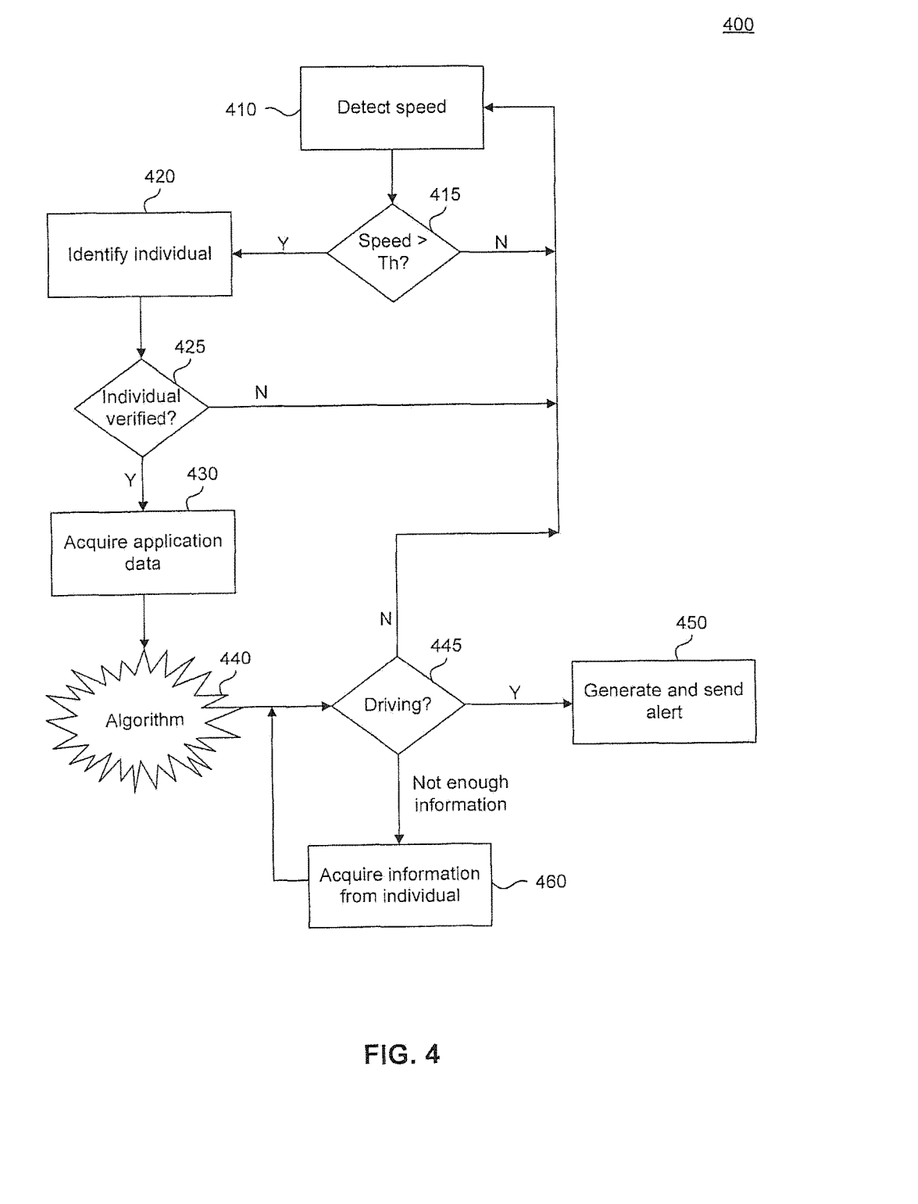
FIG. 4 illustrates an exemplary monitoring method according to embodiments of the present disclosure.

FIG. 4 illustrates a flowchart diagram of an exemplary monitoring method 400 according to embodiments of the present disclosure. In the method 400, the monitoring system monitors a speed of a device on which the monitoring system operates 410. While monitoring the speed, the system determines whether the speed of the device exceeds a predetermined threshold th 415. If the speed does not exceed the predetermined threshold (415—N), then functionality returns to speed monitoring 410.

If, on the other hand, the speed of the device exceeds the predetermined threshold (415—Y), the system identifies the individual 420. As discussed above, this is performed in one of several different ways, including requesting a unique identifier from an RFID transmitter, or by acquiring identification information from the user. Based on the received information, the system verifies whether the user is the restricted individual 425. If the user is not the restricted individual, then operation returns to speed detection 410. In an embodiment, there may be some predetermined time elapse or other trigger required before re-initiating the monitoring method.

If the user is the restricted individual, then the system attempts to acquire information from one or more relevant applications running on the device 430. During this step, the system will access various data sources associated with different applications on the device in order to gather relevant information that may evidence use or non-use of a ride-sharing or ride-hailing application. After gathering the relevant data, the monitoring system operates an algorithm 440 in order to determine whether the restricted user is driving 445. If it is determined that the restricted user is not driving (445—N), then functionality returns to speed detection 410. If, on the other hand, the algorithm determines that there is insufficient information to make a definitive determination with high certainty, then the individual is prompted for more information 460. After the restricted individual provides more information, such as in the manner described above, then the system makes an updated determination as to whether the individual is driving 445.

If the system determines that the restricted individual is driving (445—Y), then the system generates an alert containing the identification of the restricted individual and a location of the device, and transmits the alert to relevant authorities.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 5:
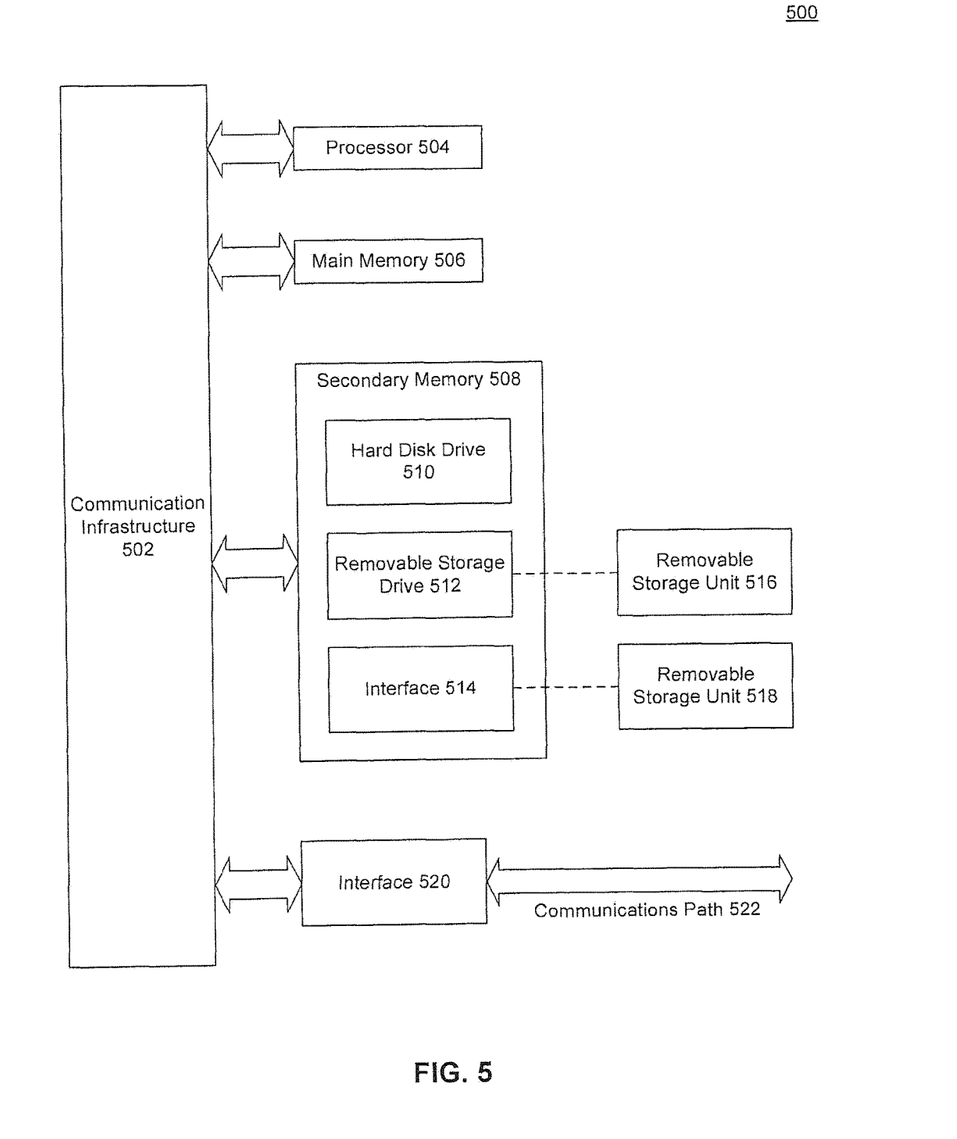
FIG. 5 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the method of FIG. 4 can be implemented in the environment of one or more computer systems or other processing systems. An example of such a computer system 500 is shown in FIG. 5. One or more of the modules depicted in the previous figures can be at least partially implemented on one or more distinct computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in tennis of this exemplary computer system. After reading this description, it will become apparent to a person skilled in the relevant art(s)

how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCM-CIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A device comprising:
a radio transmitter;
a speed sensor configured to detect a current speed of the device;
a short-range transceiver configured to communicate with a fixed device of an individual associated with the device; and
one or more processors and/or circuits configured to:
receive a current speed of the device from the speed sensor;
compare the current speed to a stored speed threshold;
determine that the current speed exceeds the stored speed threshold; and
cause the radio transmitter to transmit an alert signal in response to the determining, the alert signal including location information of the device and an identifier of an individual associated with the device; and
in response to determining that the current speed exceeds the stored speed threshold, cause the short-range transceiver to transmit a request message to the fixed device requesting an identifier of the individual associated with the fixed device,
wherein the radio transmitter is configured to periodically transmit the location information of the device.

2. The device of claim 1, wherein the one or more processors and/or circuits are further configured to generate the alert signal.

3. The device of claim 1, wherein the fixed device is affixed to the individual.

4. The device of claim 1, wherein the short-range transceiver is configured to receive the identifier from the fixed device.

5. A method for monitoring an individual, comprising:
detecting a current speed of a device associated with the individual;
comparing the current speed to a stored speed threshold;

determining that the current speed exceeds the stored speed threshold;
sending a request to a nearby device for an identifier of the individual;
receiving the identifier in response to the request transmitting an alert signal in response to the determining that includes location information of the device and an identifier of the individual; and
periodically transmitting a status signal that includes the location information of the device.

6. The method of claim 5, wherein the request is sent via a short-range communication protocol.

7. The method of claim 6, wherein the short-range communication protocol is Bluetooth.

8. The method of claim 5, wherein the sending of the request is performed in response to the determining that the current speed exceeds the stored speed threshold.

9. The method of claim 5, further comprising:
a location detector configured to detect a current location of the device,
wherein the alert signal includes the current location.

10. A system for monitoring an individual, comprising:
a wireless communication device associated with the individual, the wireless communication device including:
  a long-range radio transceiver;
  a short-range radio transceiver;
  a speed sensor configured to detect a current speed of the device; and
  one or processors and/or circuits configured to:
    receive the current speed from the speed sensor;
    compare the current speed to a stored speed threshold;
    determine that the current speed exceeds the stored speed threshold;
    transmit an alert via the long-range transceiver in response to the determining, the alert including location information of the device; and
    periodically transmit a status signal that includes the location information of the device; and
a fixed device affixed to the individual, the fixed device including:
  a memory that stores an identifier of the individual; and
  a transceiver configured to transmit the identifier to the short-range transceiver of the wireless communication device.

11. The system of claim 10, wherein the wireless communication device is configured to transmit a request to the fixed device, via the short-range radio transceiver, in response to the determining.

12. The system of claim 11, wherein the transceiver of the fixed device is configured to receive the request and to transmit the identifier in response to the receiving of the request.

13. The system of claim 12, wherein the transceiver of the fixed device is configured to encrypt the identifier before transmitting the identifier to the wireless communication device.

14. The system of claim 10, wherein the one or more processors and/or circuits are configured to periodically transmit a ping signal to the fixed device, and
wherein the transceiver of the fixed device is configured to receive the ping signal and to transmit a response ping signal to the wireless communication device in response to the receiving of the ping signal.

15. The system of claim 12, wherein the fixed device further comprises a location sensor configured to detect a current location of the fixed device,
wherein the transceiver of the fixed device is configured to transmit the current location in response to the receiving of the request.

* * * * *